United States Patent Office 2,970,693
Patented Feb. 7, 1961

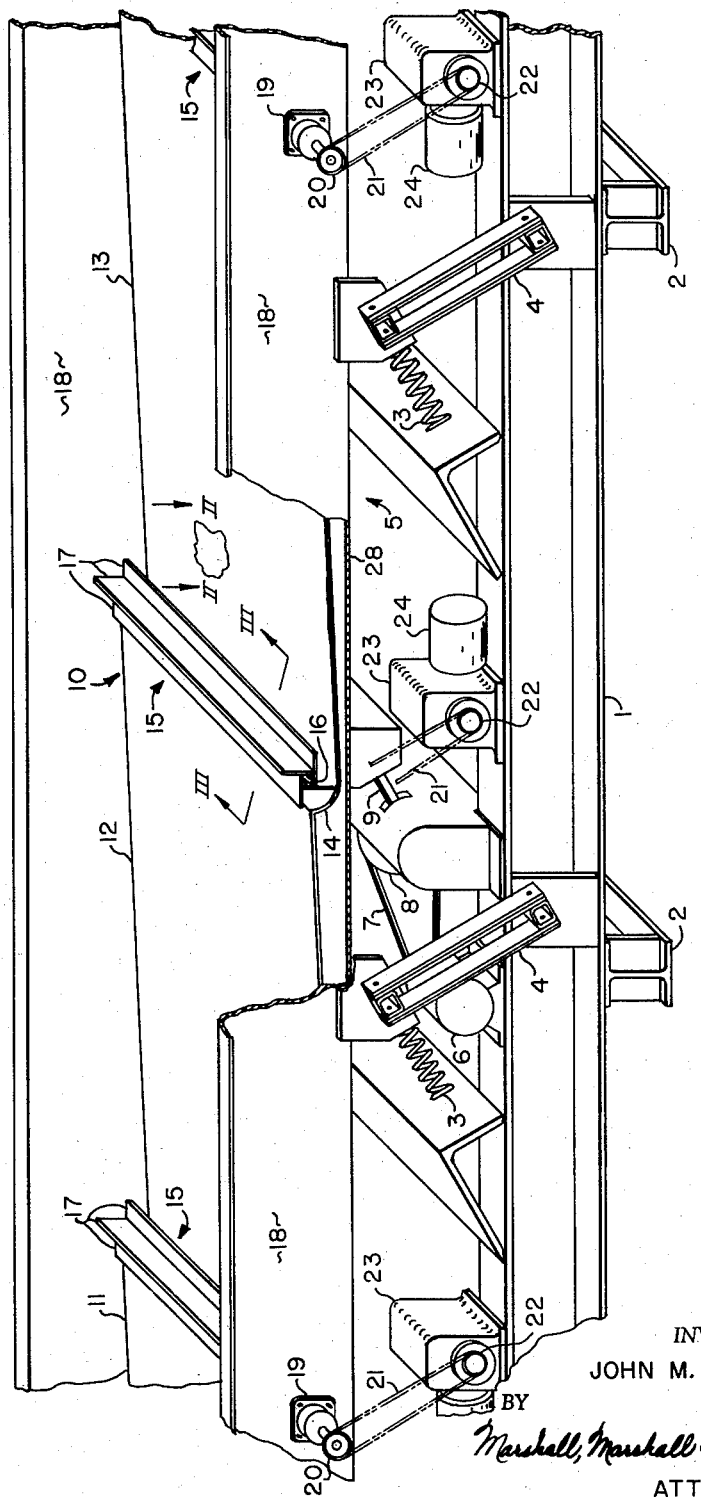

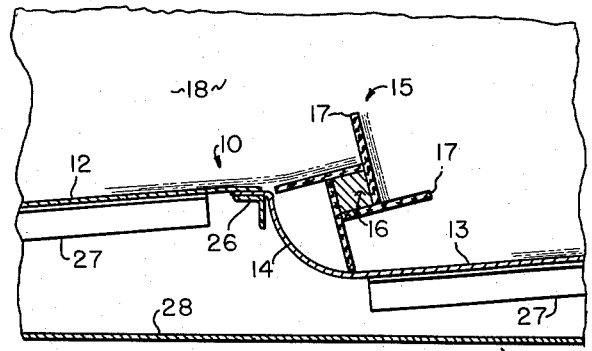
Fig. III
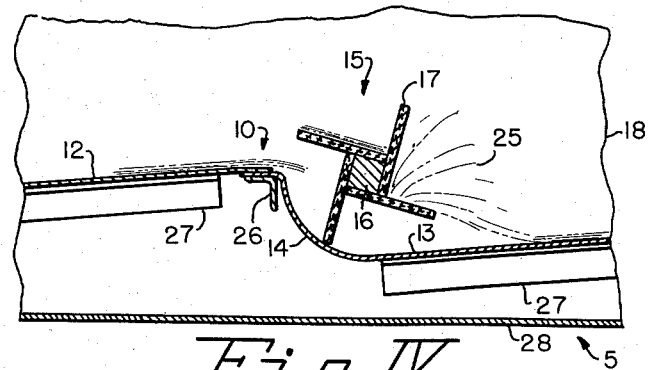
Fig. IV
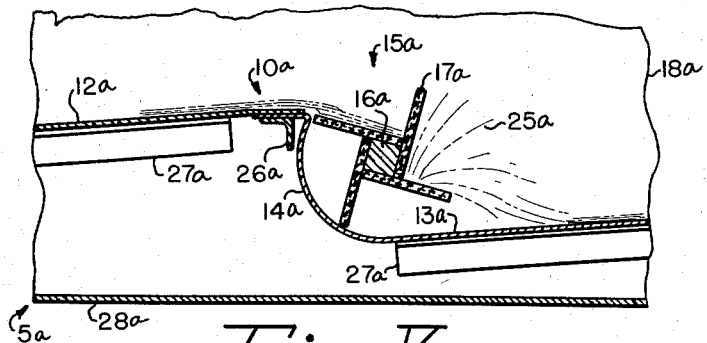
Fig. V
INVENTOR.
JOHN M. MORRIS
BY
ATTORNEYS

2,970,693

APPARATUS FOR SEPARATING GRANULAR AND PULVERULENT PARTICLES FROM FLAKY MATERIALS

John M. Morris, Louisville, Ky., assignor, by mesne assignments, to Chain Belt Company, Milwaukee, Wis., a corporation of Wisconsin Filed Nov. 12, 1958, Ser. No. 773,318

5 Claims. (Cl. 209—265)

Tobacco leaves and similar products are liable to accumulate particles of fine sand, dust, pulverulent soil treating compounds and other debris while the leaves are growing in the fields. Such foreign materials can be removed by vigorous shaking before tobacco leaves are shredded for use in cigarettes or for further treatment such as grinding into snuff and calendering into sheets to be used as wrappers.

Large leaves which are to be subsequently chopped or shredded may be cut into comparatively large pieces or large flakes, the dimensions of which may average an inch or more across. The pieces or flakes then may be passed over a vibratory screen or deck having perforations occupying a major part of its area, the perforations being large enough to pass all of the foreign particles that are sifted or are shaken downwardly through the stream of pieces or flakes. So far as the pieces or flakes themselves are concerned, however, they move over the deck as though it were imperforate.

The vibratory movement of the deck may be that of a vibratory conveyor so that pieces received upon one end of the perforated deck are conveyed toward and discharged from the other end.

Pieces that pass over the perforated deck of such a vibratory conveyor have their lower sides shaken free of particles of foreign material, which particles tend to make their way downwardly to and through the perforated deck. The foreign particles on the upper sides of the pieces, and some of the foreign particles that are transferred from the lower sides of some pieces to the upper sides of others, tend to lodge on top of pieces even though the particles be loosened by vibration. In order to separate particles from pieces on top of which the particles have lodged, the pieces in the process of this invention are turned over after being vibrated, and are again vibrated while the sides upon which particles initially lodged are turned down. The apparatus of this invention includes means for turning over the pieces. The pieces may be successively shaken, turned over, again shaken and again turned over, as often as desired, while they are being conveyed from the receiving end to the discharge end of the apparatus.

The principal object of this invention is to provide an apparatus for effectively removing accumulated particulate debris from both sides of flaky products such, for example, as leaf tobacco which has been cut into pieces but has not yet been comminuted or shredded.

More specifically it is an object of the invention to provide apparatus for removing particles of dirt (i.e. "material out of place") from both sides of pieces of substantially flat material by passing a stream of such pieces of material over a vibrating screen, turning the pieces of such material over and then again passing the stream of pieces over a vibrating screen.

Other objects and numerous advantages of the process and apparatus will appear upon perusal of the following description as illustrated in the accompanying drawings, in which:

Fig. I is a schematic view, in perspective, of a portion of apparatus embodying the instant invention, parts being broken away and parts shown in section;

Fig. II is an enlarged plan view of a fragment of a perforated deck taken substantially as indicated by the arrows II—II in Fig. I;

Fig. III is an enlarged fragmentary vertical sectional view taken substantially as indicated by the arrows III—III of Fig. I;

Fig. IV is a view similar to Fig. III showing a paddle wheel turned to a position slightly in advance clockwise of the position in which the paddle wheel is shown in Fig. III; and Fig. V is a view similar to Fig. IV in which the axis on which the paddle wheel turns is somewhat lower than the axis upon which the paddle wheel of Fig. IV is mounted.

This specification and the accompanying drawings describe and illustrate a preferred embodiment of the instant invention but they are not intended to limit the scope of the invention.

The base 1 of the apparatus illustrated in Fig. I rests upon transversely extending I-beams 2 and supports a series of coil springs 3 and leaf springs 4 which carry a vibratory conveyor trough 5 in a well known manner which permits the conveyor trough 5 to vibrate forward and upward—rearward and downward and thus convey loose material forwardly (i.e. to the right in the set-up as illustrated in Fig. I) by a rapid succession of small tosses.

Vibratory movement is imparted to the conveyor trough 5 by means of a motor 6 connected through a belt 7 to a pulley 8, a crank or eccentric (not shown) and a connecting rod 9. The mechanism which comprises the parts numbered 1 to 9 inclusive is well known. Other vibratory conveyor mechanism can be used as well. The vibratory conveyor mechanism therefore is not shown or described in detail in the instant application.

Overlying and spaced above the bottom of the conveyor trough 5 is a perforated deck 10 which as shown consists of a series of sloping sections 11, 12 and 13 with steps having curved risers 14 between adjacent sections of the deck. Extending along the axis of curvature of the risers 14 are paddle wheels 15 each of which consists of a squared shaft 16 upon which are mounted rectangular resilient strips 17 which project outwardly in the manner shown in Figs. I, III and IV to constitute paddles with V-shaped troughs between them. The squared shafts 16 have round ends or trunnions which project through the side walls 18 and are journaled in bearings 19 secured to the side walls 18. One of the projecting ends of each of the shafts 16 has a driven sprocket 20 keyed thereon, the driven sprockets 20 being connected by chains 21 to driving sprockets 22 that are located exteriorly upon gear reduction casings 23. Within the gear reduction casings 23 are gear reduction mechanisms (not shown) which connect motors 24 to the driving sprockets 22 to turn the sprockets and the paddle wheels at slow speeds. The chains 21 are substantially parallel to the leaf springs 4 so that the chains operate effectively while the conveyor trough 5 is vibrating perpendicularly to the lengths of chain 21.

With flaky material such as cut up leaf tobacco being fed upon the leading deck section the vibratory movement of the conveyor trough 5 causes the flaky material to flow over the leading section of perforated deck to the first paddle wheel 15 the paddles 17 of which turn the flakes, e.g. pieces of leaf, over. The flakes while being turned over are transferred to the deck section that is next downstream.

The speeds of rotation of the paddle wheels, for best results, are selected according to the conveying speed of the conveyor so that the flaky material can feed at least to the back of a preceding paddle or strip 17 as the lip of the strip passes the edge of the preceding deck section.

A schematic indication of the manner in which the pieces are turned is included at 25 and 25a in Figs. IV and V.

Most of the sand, soil treating material, etc., is separated from the stream of pieces of tobacco leaf or other flaky material as it passes over the first section of perforated deck, the first paddle wheel and the second section of perforated deck. The separation may be made more thorough, however, by employing additional paddle wheels and sections of deck.

The sections of decks are supported on transverse angle bars 26 and longitudinally extending angle bars 27 which are welded or otherwise secured to the walls 18 of the conveyor trough 5. The foreign material that sifts through the perforated deck 10 to the bottom 28 of the conveyor trough 5 is conveyed to the tail of the conveyor trough and is discharged therefrom into a receptacle or through a conduit that is separate from any conduit or receptacle that receives the cleaned leaves. Alternatively the bottom of the conveyor trough 5 may be left open and the dirt permitted to fall into bins or a chute beneath the trough 5.

The form of device illustrated by Fig. V is like the one illustrated by Fig. IV except that the shaft 16a is located considerably below the plane of the deck 12a so that none of the flakes or pieces will have any tendency to tip back from the paddle wheel 16a onto the edge of the preceding perforated deck section 12a. Whether the arrangement shown in Fig. IV or the arrangement shown in Fig. V is to be preferred in any particular installation will depend on various circumstances such as the nature of the pieces being processed, the treatment to which they had previously been subjected and the conditions surrounding the installation.

The mechanism described above and shown in the accompanying drawings is to be regarded as illustrative only. The invention includes modifications which are within the spirit and scope of the subjoined claims.

I claim:

1. Apparatus for separating granular and pulverulent particles from material consisting of substantially flat pieces comprising, in combination; a vibratory conveyor adapted to convey said material from an upstream receiving end to a downstream discharge end; said conveyor having a deck including preceding and succeeding sections; a downstream end of said preceding section being disposed in step fashion with respect to an upstream end of said succeeding section; inverting means for said material disposed in said step between sections including a rotating paddle; the axis of rotation of said paddle being so disposed with respect to said preceding screen that as said paddle sweeps past said downstream end of said preceding section it constitutes a substantially horizontal continuation of said section whereby said flat pieces of material are conveyed onto said paddle retaining their horizontal positions.

2. Apparatus for separating granular and pulverulent particles from material consisting of substantially flat pieces comprising, in combination; a vibratory conveyor adapted to convey said material from an upstream receiving end to a downstream discharge end; said conveyor having a deck including preceding and succeeding perforated sections; a downstream end of said preceding section being disposed in step fashion with respect to an upstream end of said succeeding section; inverting means for said material disposed in said step between sections including a rotating paddle; the axis of rotation of said paddle being so disposed with respect to said preceding screen that as said paddle sweeps past said downstream end of said preceding section it constitutes a substantially horizontal continuation of said section whereby said flat pieces of material are conveyed onto said paddle retaining their horizontal positions; the rotation of said paddle being operative to invert its material receiving surface and thus the flat pieces of material; the speed of rotation of said paddle being such that said flat pieces of material are discharged from said paddle primarily by gravity in inverted position on said succeeding section.

3. Apparatus for separating granular and pulverulent particles from material consisting of substantially flat pieces comprising, in combination; a vibratory conveyor adapted to convey said material from an upstream receiving end to a downstream discharge end; said conveyor having a deck including preceding and succeeding perforated sections; a downstream end of said preceding section being disposed in step fashion with respect to an upstream end of said succeeding section; inverting means for said material disposed in said step between sections including a rotating paddle; the axis of rotation of said paddle being so disposed with respect to said preceding screen that as said paddle sweeps past said downstream end of said preceding section it constitutes a substantially horizontal continuation of said section whereby said flat pieces of material are conveyed onto said paddle retaining their horizontal positions; the rotation of said paddle being operative to invert its material receiving surface and thus the flat pieces of material; the speed of rotation of said paddle being such that said flat pieces of material are discharged from said paddle primarily by gravity in inverted position on said succeeding section; said step between said sections being joined by a cylindrically concave riser to a radius to enclose that portion of the sweep of said paddle.

4. Apparatus for separating granular and pulverulent particles from material consisting of substantially flat pieces comprising, in combination; a vibratory conveyor adapted to convey said material from an upstream receiving end to a downstream discharge end; said conveyor having a deck including preceding and succeeding perforated sections; a downstream end of said preceding section being disposed in step fashion with respect to an upstream end of said succeeding section; inverting means for said material disposed in said step between sections including a rotating paddle; the axis of rotation of said paddle being so disposed with respect to said preceding screen that as said paddle sweeps past said downstream end of said preceding section it constitutes a substantially horizontal continuation of said section whereby said flat pieces of material are conveyed onto said paddle retaining their horizontal positions; the rotation of said paddle being operative to invert its material receiving surface and thus the flat pieces of material; said flat pieces of material being discharged primarily by gravity in inverted position on said succeeding section; said inverting means comprising a plurality of paddles mounted on a shaft such that each of said paddles abuts a lower surface of a preceding paddle and extends outwardly over an abutting end of a succeeding paddle.

5. Apparatus for separating granular and pulverulent particles from material consisting of substantially flat pieces comprising, in combination; a vibratory conveyor adapted to convey said material from an upstream receiving end to a downstream discharge end; said conveyor having a deck including preceding and succeeding perforated sections; a downstream end of said preceding section being disposed in step fashion with respect to an upstream end of said succeeding section; inverting means for said material disposed in said step between sections including a rotating paddle; the axis of rotation of said paddle being so disposed with respect to said preceding screen that as said paddle sweeps past said downstream end of said preceding section it constitutes a substantially horizontal continuation of said section whereby said flat pieces of material are conveyed onto said paddle retaining their horizontal positions; the rotation of said paddle being operative to invert its material receiving surface and thus the flat pieces of material; said flat pieces of material being discharged primarily by gravity in inverted position on said succeeding section; said inverting means comprising a plurality of paddles mounted on a square shaft; each of said paddles abutting a lower surface of a preceding paddle and extending outwardly over the abutting end of the succeeding paddle.

References Cited in the file of this patent

UNITED STATES PATENTS 2,775,347   Weston _____ Dec. 25, 1956